March 25, 1930.  M. C. COX ET AL  1,752,066
LINE BORING MACHINE
Filed April 12, 1927  3 Sheets-Sheet 1

INVENTOR.
MAURICE C. COX
RALPH B. RYAN
BY Townsend Loftus & Abbett
ATTORNEYS.

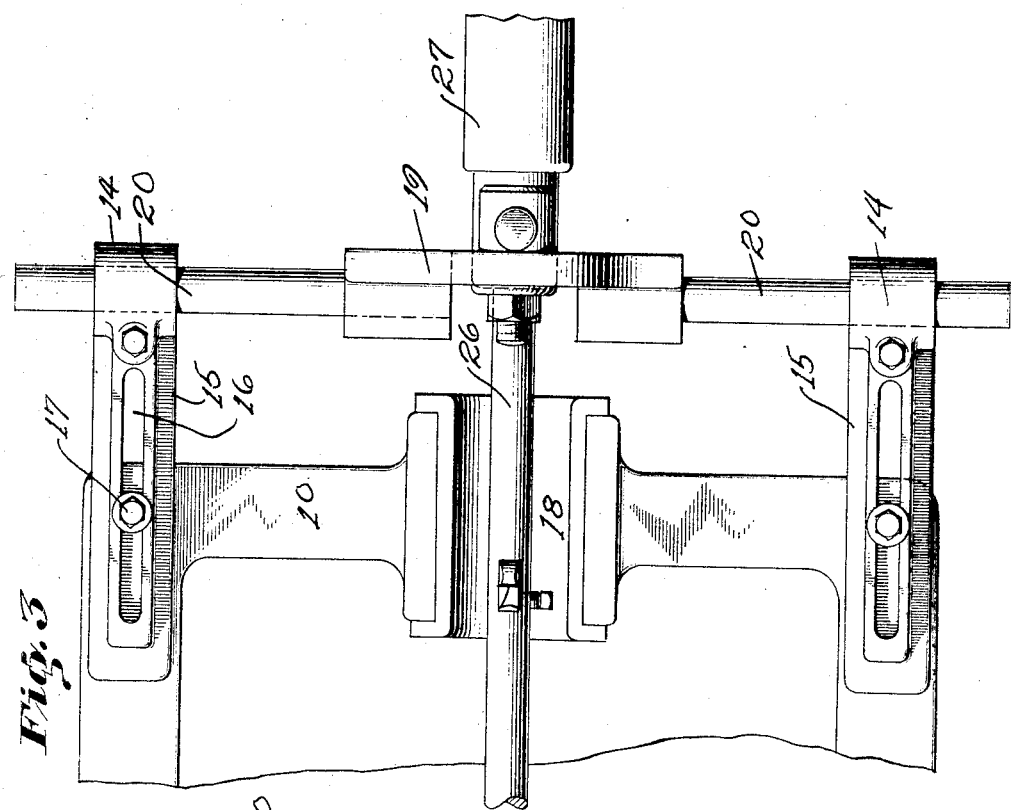
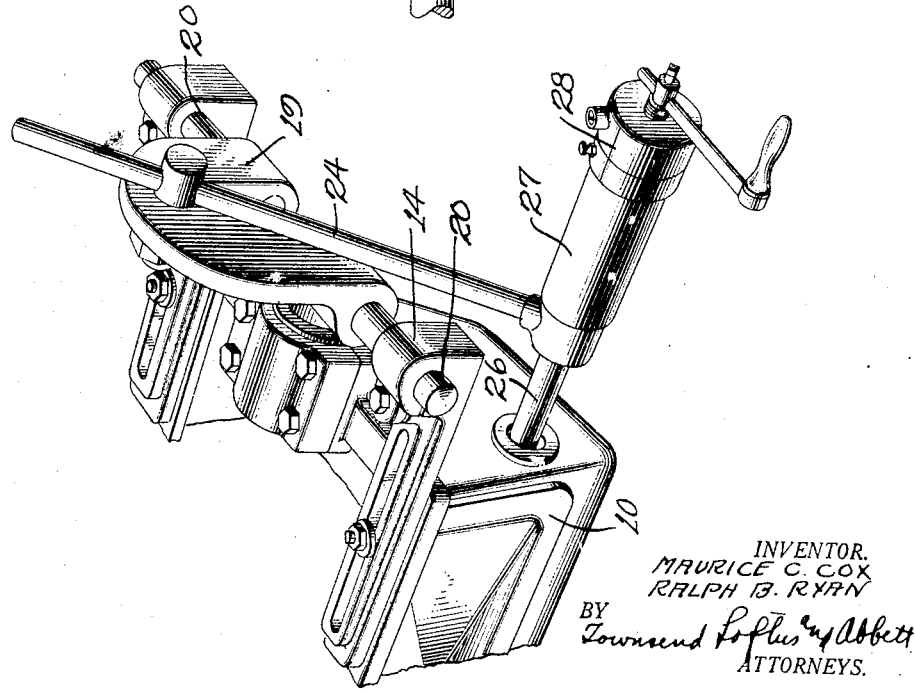

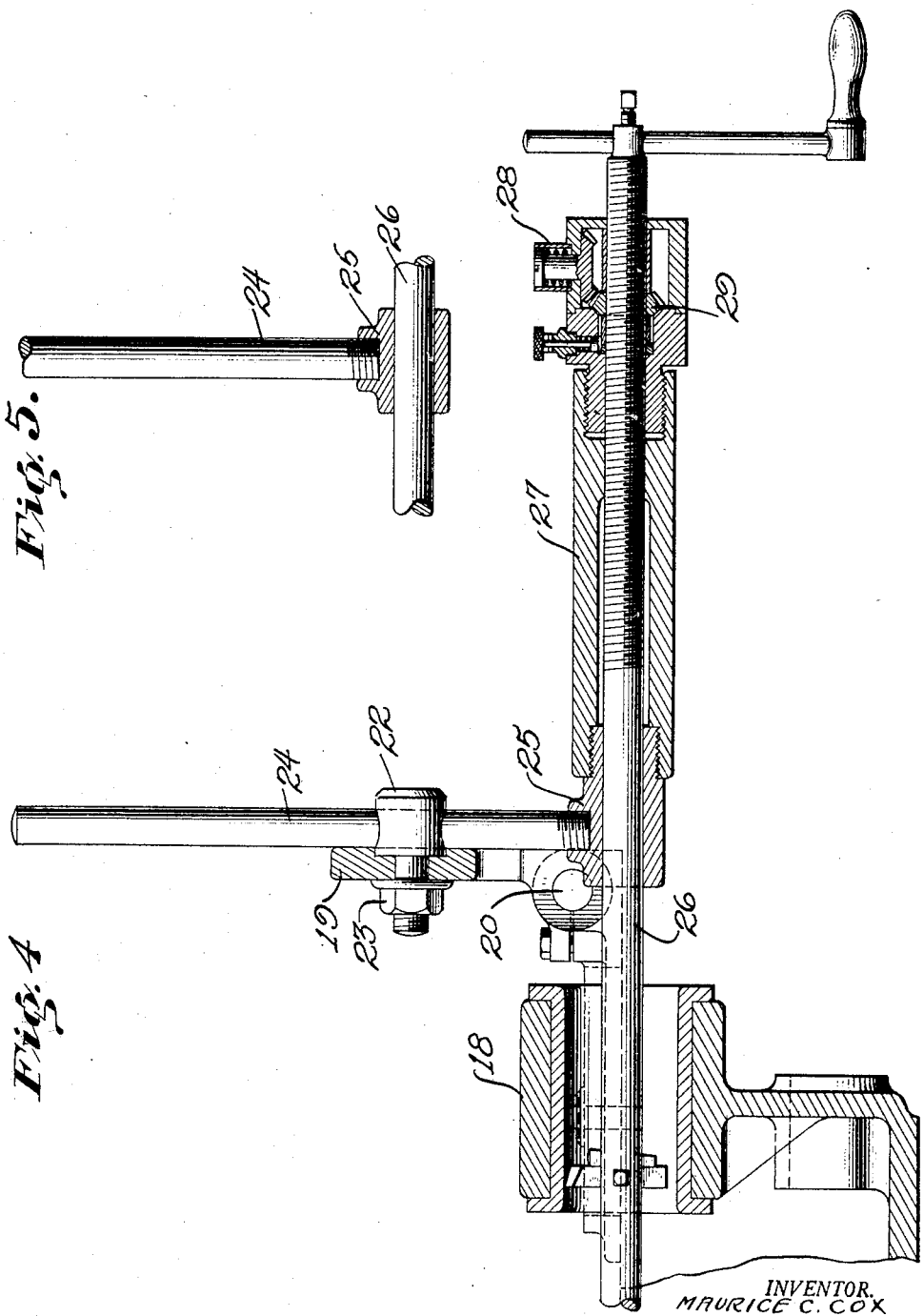

Patented Mar. 25, 1930

1,752,066

UNITED STATES PATENT OFFICE

MAURICE C. COX AND RALPH B. RYAN, OF OAKLAND, CALIFORNIA

LINE-BORING MACHINE

Application filed April 12, 1927. Serial No. 183,082.

This invention relates to machine tools and particularly pertains to a line boring machine.

It is the principal object of the present invention to provide an improved and comparatively inexpensive boring machine for use in accurately and inexpensively boring lines of bearings, the machine being easily set up relative to the bearings and the boring bar accurately aligned with the bearings so that the boring operations may be expeditiously accomplished with assurance that the bearings will be in absolute alignment.

In carrying out this object we provide a line boring machine which may be directly mounted on an engine crankcase or similar device regardless of its dimensions. This machine is equipped with spaced boring bar supports which may be adjusted in any direction so that the boring bar may be accurately aligned with a line of bearings and rigidly supported for accurate operation, regardless of the number of bearings in the line. After the machine is set up the boring bar may be quickly aligned with a second line of bearings parallel to the first line for boring them in absolute parallelism to the first line of bearings.

One form which the invention may assume is exemplified in the following description and illustrated by way of example in the accompanying drawings, in which:

Fig. 2 is a fragmentary view in perspective disclosing the manner in which the device is set up when boring the cam shaft bearings of an automobile engine.

Fig. 3 is a fragmentary view in plan showing one of the bar supporting devices arranged on the crankcase of an engine.

Fig. 4 is a fragmentary view in longitudinal section disclosing the boring bar operating mechanism and support.

Fig. 5 is a fragmentary view showing one of the types of bearings used by the boring bar supports.

Figure 1:
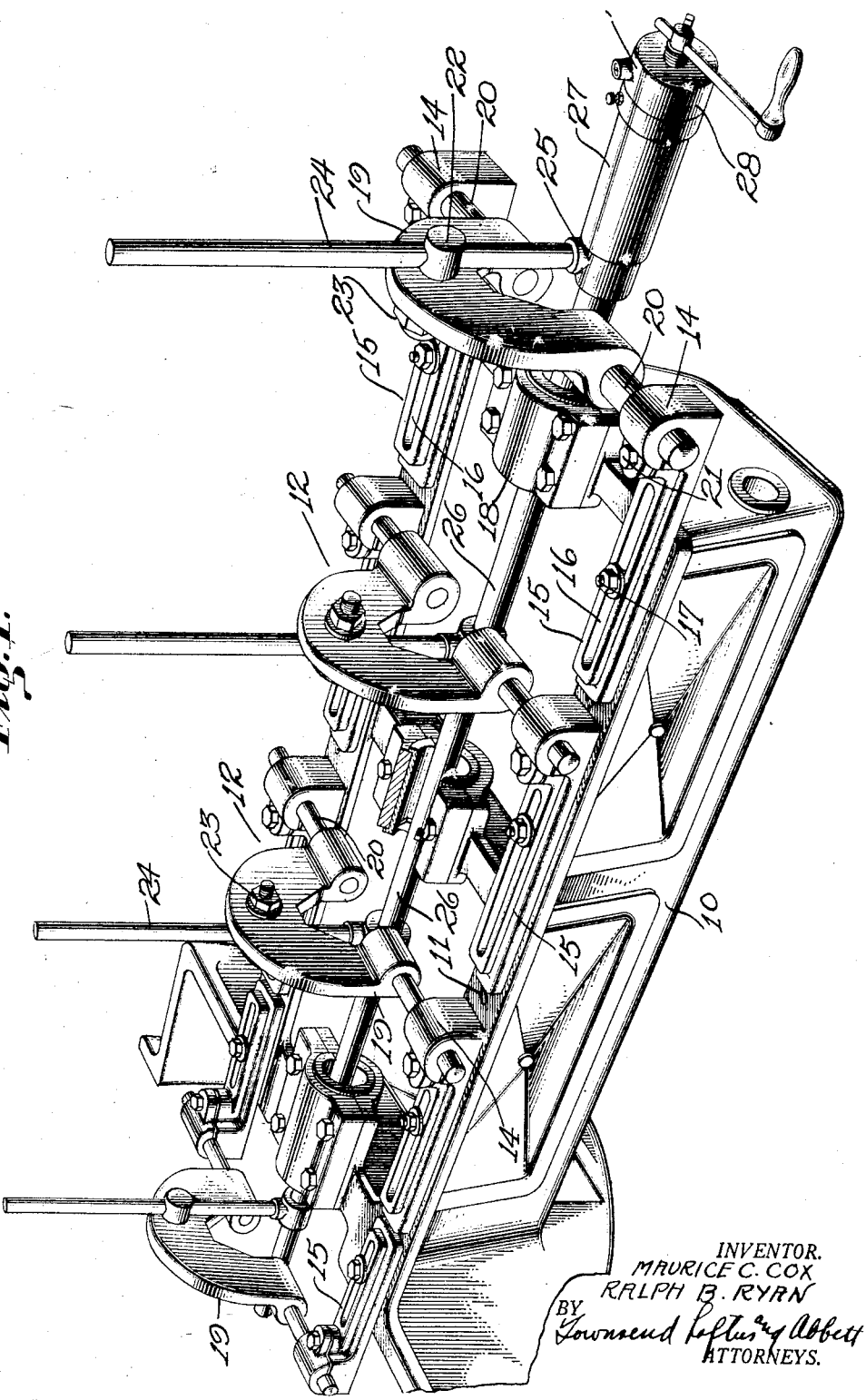
Fig. 1 is a perspective view of a crankcase of an automobile engine with our improved apparatus mounted for operation thereon.

The invention in the form disclosed in the present instance is particularly adapted for use in garages and repair shops for reboring the main and cam shaft bearings of automobile engines. It is particularly adapted for this use as it is of inexpensive construction and may be quickly mounted on the crankcase of an engine and aligned with the bearings thereof. Likewise, it is capable of use in connection with a portable boring tool which may be manually operated if desired.

Reference being had to the accompanying drawings, 10 indicates a crankcase of an automobile engine which is shown inverted, as the main bearings of an automobile engine usually are arranged at the under side of the crankcase. This under side of the crankcase, which is exposed when the latter is inverted, is finished and is provided with a series of tapped openings 11 by means of which the oil sump of the engine is connected to the crankcase by cap screws. In the present instance we utilize these tapped openings 11 for mounting a series of bar supporting devices 12 on the crankcase.

These bar supporting devices each comprise a pair of bearings 14 having pads 15 which are formed with slotted openings 16. Studs 17 are threaded in the tapped holes 11 of the crankcase and project upwardly through the slots 16 in the pads 15 and are fitted at their upper ends with nuts so that the bearings 14 may be clamped in position on the crankcase. The provision of the slots 16 enables the bearings to be adjusted longitudinally of the crankcase so that the bar supporting devices 12 may be positioned properly with relation to the main bearings 18 of the crank case.

A frame plate 19 is provided for each boring bar supporting device. This plate is arranged vertically and is fitted at its lower end with outwardly projecting horizontally disposed trunnions 20 which are journalled in the bearings 14. The trunnions 20 are fixed to the frame plate and may be stationarily clamped in the bearings as the latter are split and provided with clamping screws 21. By loosening the screws 21 the frame plate may be turned in the bearings 14 and thereby angularly adjusted.

Extending transversely through the upper end of each frame plate 19 is a clamping member 22 which projects from opposite sides of the frame plate 19. At one side of the frame plate 19 the clamping member 22 is enlarged and formed with a transverse opening. At the other side the clamping member 22 is threaded and receives a clamping nut 23. A bar 24 slidably extends through the opening in the enlarged end of the clamping member 22. At one end this bar 24 carries a boring bar bearing 25. When the clamping nut 23 is released, the clamping member 22 may be revolved or the bar 24 may be reciprocated through the opening in the clamping member or swung radially to adjust the boring bar bearing 25 with respect to the main bearings 18. After the bearing has been properly positioned relative to the main bearing, the clamping nut 23 may be tightened which will firmly clamp the bar 24 between the clamping member 22 and the adjacent surface of the frame plate 19. The bar bearing will then be held stationary relative to the frame plate and if the trunnions of the latter are secured in the bearings 14, the bar bearing will be held stationary relative to the engine bearing.

In boring a line of bearings it is essential that the boring bar be rigidly supported to prevent deflection thereof and for this purpose a bar supporting device 12 may be arranged at spaced intervals along the crankcase to support the boring bar. As the bar bearing of each supporting device is adjustable in all directions, it is a comparatively simple matter to align a boring bar supported thereby with a line of bearings. After the boring bar is properly aligned all of the bar bearings may be clamped in position to retain the bar in alignment with the bearings.

We disclose a boring bar 26 as rotatably mounted in the bearings of the bar supports 12. This boring bar 26 is illustrated as a part of a boring apparatus which is described and claimed in our co-pending application entitled Portable baring machine, filed March 9, 1927, Ser. No. 173,815. It will suffice to state that this machine includes what we prefer to term a bar sleeve 27 which is stationarily mounted on the bearing of the first bar support. To form this connection one end of the bar sleeve is counterbored and threaded so that it may be threadedly connected to the exteriorly threaded end of the bar bearing.

The boring device also includes a feed box 28 which is threadedly connected with the other end of the bar sleeve 27 and through which the boring bar extends. This feed box encloses a collared feed nut 29, relative rotation between which and the boring bar 26 will advance or retract the latter through the boring bar bearings. The feed nut 29 may be rapidly revolved by means of a hand feed to rapidly advance or retract the boring bar through the bearings without turning the latter, or it may be automatically held from rotation at intermittent intervals when the boring bar is revolved so as to advance the boring bar a certain amount at each revolution thereof.

A third feed for the boring bar consists in a hand feed which necessitates revolving the entire feed box and utilize the threaded connection between the feed box and bar sleeve to advance or retract the boring bar as desired, and is used when turning fillets and facing the bearings.

In operation of the present device, the crankcase is removed from the engine and inverted. The bar supporting devices are then mounted on the inverted face of the crankcase by securing the bearings 14 thereto. As these bearings 14 are adjustable longitudinally of the crankcase, the bar supporting devices may be positioned exactly as desired.

After the bearings 14 have been positioned, the boring bar 26 is extended through the bearings of the bar supports and the bar sleeve 27 is secured to the first bearing as shown in Fig. 4. During this time the bar bearings 25 are freely adjustable as the frame plates 19 may be swung back and forth and the bars 24 carrying the bearings may be reciprocated or swung radially.

The boring bar 26 is then aligned with the bearings and the clamping screws of the bearings 14 are tightened to firmly clamp the frame plates 19 stationary. Likewise, the clamping nuts 23 are tightened to firmly hold the bar bearings stationary relative to the plate 19. When this has been done the bar bearings 14 will be rigidly held in correct alignment to the bearings. Cutting tools may then be applied to the boring bar and the latter may be operated to face the bearings, bore them, and turn the fillets.

After the main bearings have been bored, if it is desired to bore the cam shaft bearings, the clamping nuts 23 are released and the boring bar is removed from the bar bearings. The bars 24 are then swung until they approximately align with the cam shaft bearings, indicated by the numeral 31. The boring bar is then projected through the bar bearings and through the cam shaft bearings and aligned therewith. After they are in proper alignment, the clamping nuts 23 are again tightened and the boring bar is actuated to bore the bearings.

It is obvious that in this manner the cam shaft bearings will be bored in absolute parallelism to the main bearings and with but one setting up of the device. The arrangement of the device when boring the cam shaft bearings is disclosed in Fig. 2.

From the foregoing it is obvious that we have provided a very simple and efficient machine for boring the line bearings of an engine, which machine is simple and inexpensive in construction and easy to operate so that it will be a valuable addition to machine tools in garages and machine shops.

We are also aware that our invention can be applied to other uses than that disclosed and while we have shown the preferred embodiment and application of our invention, it is to be understood that various changes in its construction and mode of its operation may be made without departing from the spirit of the invention as defined in the appended claim.

Having thus described our invention, what we claim and desire to secure by Letters Patent is:

A boring bar support comprising a pair of bearings adapted to be secured to the crank case at opposite sides of a bearing to be bored and disposed at right angles to the bearing to be bored, a frame plate disposed intermediate said bearings and in a plane at right angles to the axis of the bearing to be bored, a trunnion projecting from each side of the plate and disposed in said bearings whereby the plate may rotate in a plane parallel to the axis of the bearing to be bored, said bearings being capable of adjustment to hold said plate in a stationary position, a member connected with the plate and disposed with its axis substantially parallel with the bearing to be bored, a bar arranged at right angles to said member and slidably connected therewith to slide in a plane at right angles to the axis of said member, said member being normally rotatable, means for simultaneously rendering said member and said bar fixed relative to said plate, a boring bar bearing carried at one end of said bar and arranged with its axis at right angles to the axis of the bar.

MAURICE C. COX.
RALPH B. RYAN.